(12) United States Patent
Biskupski

(10) Patent No.: US 7,837,125 B2
(45) Date of Patent: Nov. 23, 2010

(54) METHODS AND SYSTEMS FOR ENCODING A MAGNETIC STRIPE

(75) Inventor: Ted Biskupski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 11/965,674

(22) Filed: Dec. 27, 2007

(65) Prior Publication Data

US 2009/0166422 A1    Jul. 2, 2009

(51) Int. Cl.
G06K 19/06    (2006.01)
(52) U.S. Cl. .................. 235/493; 235/375; 235/380; 235/449; 235/494
(58) Field of Classification Search ............... 235/375, 235/449, 493, 380, 487, 494
See application file for complete search history.

(56) References Cited

U.S. PATENT DOCUMENTS

| | | |
|---|---|---|
| 3,346,294 A | 10/1967 | Sartz |
| 4,319,684 A | 3/1982 | Backman et al. |
| 4,828,105 A | 5/1989 | Silengo et al. |
| 5,135,157 A | 8/1992 | Cruz |
| 5,139,454 A | 8/1992 | Earnest |
| 5,143,279 A | 9/1992 | Gaines |
| 5,219,184 A | 6/1993 | Wolf |
| D344,757 S | 3/1994 | Kruyt |
| 5,516,033 A | 5/1996 | Bernetich |
| 5,575,384 A | 11/1996 | Saye |
| 5,626,551 A | 5/1997 | Kearns et al. |
| 5,641,115 A | 6/1997 | Brewster |
| 5,645,214 A | 7/1997 | Taganas |
| 5,687,992 A | 11/1997 | Finkelshteyn |
| 5,791,474 A | 8/1998 | Hansen |
| D400,919 S | 11/1998 | Pickel |
| 5,845,425 A | 12/1998 | Leake et al. |
| 5,862,979 A | 1/1999 | Hill et al. |
| 5,906,063 A | 5/1999 | Magee, Sr. |
| 5,918,909 A | 7/1999 | Fiala et al. |
| 5,941,573 A | 8/1999 | Yordinsky |
| 5,946,834 A | 9/1999 | Bradley |

(Continued)

FOREIGN PATENT DOCUMENTS

EP    0725376    8/1996

(Continued)

OTHER PUBLICATIONS

"Identification Cards—Recording Technique—Part 7: Magnetic Strip—High Coercivity, High Density", ISO Standard, ISO/IEC 7811-7:2004 downloaded Dec. 26, 2007, 2 pgs.

(Continued)

*Primary Examiner*—Thien M. Le
*Assistant Examiner*—Tuyen K Vo

(57) ABSTRACT

Methods and apparatus for encoding information on a magnetic stripe of a transaction card are disclosed. According to one aspect, a transaction card includes a first surface and a second surface that substantially opposes the first surface. The second surface has a magnetic stripe. A first representation of a first pattern and a second representation of the first pattern can be encoded on the magnetic stripe. In one embodiment, the first representation can be encoded beginning at approximately a first distance from a first edge of the second surface, and the second representation can be encoded to within approximately the first distance from a second edge of the second surface.

22 Claims, 6 Drawing Sheets

U.S. PATENT DOCUMENTS

| | | | |
|---|---|---|---|
| 5,963,915 | A | 10/1999 | Kirsch |
| 5,963,916 | A | 10/1999 | Kaplan |
| 5,984,091 | A | 11/1999 | Orr et al. |
| 6,003,254 | A | 12/1999 | Lorber |
| 6,070,719 | A | 6/2000 | Pollock |
| 6,092,841 | A | 7/2000 | Best et al. |
| 6,199,912 | B1 | 3/2001 | Finkelshteyn |
| 6,224,108 | B1 | 5/2001 | Klure |
| 6,233,682 | B1 | 5/2001 | Fritsch |
| D447,055 | S | 8/2001 | Several et al. |
| 6,299,530 | B1 | 10/2001 | Hansted et al. |
| D457,555 | S | 5/2002 | Stephens-D'Angelo et al. |
| 6,385,596 | B1 | 5/2002 | Ansell et al. |
| 6,418,648 | B1 | 7/2002 | Hollingsworth et al. |
| 6,457,638 | B1 | 10/2002 | Schmidt |
| 6,491,213 | B2 | 12/2002 | Purcell |
| 6,619,480 | B2 | 9/2003 | Smith |
| 6,659,271 | B2 | 12/2003 | Parsons |
| 6,698,116 | B2 | 3/2004 | Waldron |
| 6,731,312 | B2 | 5/2004 | Robbin |
| 6,877,263 | B2 | 4/2005 | Clark |
| 6,957,737 | B1 | 10/2005 | Frederickson et al. |
| D512,456 | S | 12/2005 | Diaz et al. |
| 7,040,049 | B2 | 5/2006 | Cox et al. |
| 7,055,740 | B1 | 6/2006 | Schultz et al. |
| 7,080,776 | B2 | 7/2006 | Lewis et al. |
| 7,204,048 | B2 | 4/2007 | Kershner et al. |
| D548,279 | S | 8/2007 | Gulakos |
| 7,277,870 | B2 | 10/2007 | Mourad et al. |
| 7,278,584 | B1 | 10/2007 | Gandel et al. |
| 7,322,519 | B2 | 1/2008 | Blank et al. |
| 7,409,788 | B2 | 8/2008 | Lauer et al. |
| 7,490,720 | B2 | 2/2009 | Cole et al. |
| 7,500,604 | B2 | 3/2009 | Holme |
| 7,546,288 | B2 | 6/2009 | Springer et al. |
| 2001/0034703 | A1 | 10/2001 | Picciallo et al. |
| 2002/0002468 | A1 | 1/2002 | Geisler et al. |
| 2002/0080714 | A1 | 6/2002 | Pierson et al. |
| 2002/0088855 | A1 | 7/2002 | Hodes |
| 2002/0147683 | A1 | 10/2002 | Capobianco et al. |
| 2002/0157974 | A1 | 10/2002 | Krahn |
| 2002/0195816 | A1 | 12/2002 | Anise |
| 2003/0004889 | A1 | 1/2003 | Fiala et al. |
| 2003/0018586 | A1 | 1/2003 | Krahn |
| 2003/0150142 | A1 | 8/2003 | Street |
| 2003/0156686 | A1 | 8/2003 | Pines |
| 2003/0230501 | A1 | 12/2003 | Smolev |
| 2004/0035942 | A1* | 2/2004 | Silverman .......... 235/493 |
| 2004/0064374 | A1 | 4/2004 | Cho |
| 2004/0140361 | A1 | 7/2004 | Paul et al. |
| 2004/0254836 | A1 | 12/2004 | Barabas et al. |
| 2004/0267622 | A1 | 12/2004 | Taylor et al. |
| 2004/0268386 | A1 | 12/2004 | Logan et al. |
| 2005/0100312 | A1 | 5/2005 | Commons et al. |
| 2005/0167301 | A1 | 8/2005 | Oram |
| 2005/0171795 | A1 | 8/2005 | Kearby et al. |
| 2005/0182675 | A1 | 8/2005 | Huettner |
| 2006/0032764 | A1 | 2/2006 | Swenson |
| 2006/0042986 | A1 | 3/2006 | Simkowski |
| 2006/0086630 | A1 | 4/2006 | Cheong et al. |
| 2006/0118618 | A1 | 6/2006 | Schultz et al. |
| 2006/0131398 | A1* | 6/2006 | Lewis et al. .......... 235/380 |
| 2006/0185201 | A1 | 8/2006 | Fachon et al. |
| 2006/0212401 | A1 | 9/2006 | Ameerally et al. |
| 2006/0224516 | A1 | 10/2006 | Lemon et al. |
| 2006/0235864 | A1 | 10/2006 | Hotelling et al. |
| 2006/0243609 | A1 | 11/2006 | Cole et al. |
| 2006/0259189 | A1 | 11/2006 | Perlow et al. |
| 2006/0261154 | A1 | 11/2006 | Arthur et al. |
| 2007/0038577 | A1 | 2/2007 | Werner et al. |
| 2007/0063052 | A1 | 3/2007 | Chakiris et al. |
| 2007/0090184 | A1 | 4/2007 | Lockwood et al. |
| 2007/0154167 | A1 | 7/2007 | Ando et al. |
| 2007/0174200 | A1 | 7/2007 | Sung-Min et al. |
| 2007/0187492 | A1 | 8/2007 | Graves et al. |
| 2007/0198418 | A1 | 8/2007 | Macdonald et al. |
| 2007/0208664 | A1 | 9/2007 | Ortega |
| 2007/0224969 | A1 | 9/2007 | Rao |
| 2007/0267502 | A1 | 11/2007 | Zellner et al. |
| 2007/0278280 | A1 | 12/2007 | Wert et al. |
| 2008/0052371 | A1 | 2/2008 | Partovi et al. |
| 2008/0116088 | A1 | 5/2008 | Roberts |
| 2008/0116089 | A1 | 5/2008 | Roberts |
| 2008/0120609 | A1 | 5/2008 | Gates et al. |
| 2008/0154722 | A1 | 6/2008 | Galinos |
| 2008/0159715 | A1 | 7/2008 | Fuasaro et al. |
| 2008/0188209 | A1 | 8/2008 | Dorogusker et al. |
| 2008/0190267 | A1 | 8/2008 | Rechstein et al. |
| 2008/0320139 | A1 | 12/2008 | Fukuda et al. |
| 2009/0063292 | A1 | 3/2009 | Cole et al. |
| 2009/0104539 | A1 | 4/2009 | Watanabe et al. |
| 2009/0218392 | A1 | 9/2009 | Biskupski et al. |
| 2009/0283594 | A1 | 11/2009 | Walton et al. |

FOREIGN PATENT DOCUMENTS

| | | |
|---|---|---|
| EP | 0927945 | 7/1999 |
| EP | 1111562 | 6/2001 |
| FR | 2827981 | 1/2003 |
| WO | WO99/24942 A | 5/1999 |
| WO | WO00/28461 | 5/2000 |
| WO | WO00/43852 | 7/2000 |
| WO | WO00/62265 | 10/2000 |
| WO | WO01/41023 | 6/2001 |
| WO | WO01/44908 | 6/2001 |
| WO | WO01/46786 | 6/2001 |
| WO | WO01/50305 | 7/2001 |
| WO | WO02/08869 | 1/2002 |
| WO | 2004/038567 A | 5/2004 |
| WO | 2004/044770 A | 5/2004 |

OTHER PUBLICATIONS

"American National Standard Specifications for Credit Cards", American National Standards Institute, Inc. (ANSI), x4.13-1971, 1971, 18 pgs.

"American National Standard Magnetic-Stripe Encoding for Credit cards", American National Standards Institute, Inc. (ANSI), x4.16-1976, 1976, 12 pgs.

Offenberg, J. "Markets—Gift Cards", Journal of Economic Perspectives, vol., 21, No. 2, Spring 2007, pp. 227-238.

U.S. Appl. No. 12/041,536, entitled "Multi-Pack Gift Card and Activation Thereof", filed Mar. 3, 2008.

U.S. Appl. No. 12/197,975, entitled "Carrier Card Arrangement with Removable Envelope", filed Aug. 25, 2008.

U.S. Appl. No. 12/262,097, entitled "Method for Assembling and Activating a Multi-Pack Package of Transaction Cards", filed Oct. 30, 2008.

"Identification Cards-Recording Technique", International Standard ISO/IEC, vol. 7811-2, No. Third Edition, Feb. 1, 2001, pp. 1-21.

Pottery Barn, Gift Cards, Web Page, downloaded Jun. 27, 2008, 1 pg.

International Search Report and Written Opinion for PCT/US2008/082097, mailed Feb. 27, 2009.

European Search Report from European Patent No. 08171261.4 dated Feb. 24, 2009.

"list." Dictionary of Publishing and Printing. London: A&C Black, 2006, www.credoreference.com/entry/acbpublishing/list, p. 1.

"listing." Collins English Dictionary. London: Collins, 2000, www.credoreference.com/entry/hcengdict/listing, p. 1.

"bin." Collins English Dictionary, London: Collins, 2000, www.credoreference.com/entry/hcengdict/bin, p. 1.

"rack 1",Collins English Dictonary, London, Collins 2000, www.credoreference.com/entry/hcengdict.rack_1, 1 pg.

"price", Chambers 21st Centruy Dictionary, London, Chambers Harrap, 2001, www.credoreference.com/entry/chambdict/price, 1 pg.

"allow", Webster's Third New International Dictionary, Merriam-Webster, downloaded Jul. 14, 2009, http://lionreference.chadwyck.com/searchFulltext.do?id=871261&idType=offset&divLevel=2&queryId=../sessions/1247680262__19043&area=mwd&forward=refshelf&trail=refshelf, 2 pg.

"value", Webster's Third New International disconary, Merriam-Webster, Incorporated, downloaded Jul. 15, 2009, http://lionreference.chadwyck.com/searchFulltext.do?id=38664807&idTyple=offset&divLevel=2&queryID=../session/1247683362__2487&area=mwd&forward=refshelf&trail=refshelf, pg. 4.

"media", Chambers 21st Century Dictionary, London, Chambers Harrap, 2001, downloaded Jul. 15, 2009, www.credoreference.com/entry/chambdict/media.com, 1 pg.

"associate", Collins English Dictionary, London, Collins 2000, www.credoreference.com/entry/hcengdict/associate, 1 pg.

"active", Webster's Third New International Dictionary, Merriam-Webster, Inc., downloaded Jul. 16, 2009, http://lionreference.chadwyck.com/searchFulltext.do?id=313560&idType=offset&divLevel=2&queryID=../session/1247778592__27918&area=mwd&forward=refshelf&trail=refshelf, 3 pg.

"activate", Webster's Third New International Dictionary, Merriam-Webster, Inc., downloaded Jul. 16, 2009, http://lionreference.chadwyck.com/searchFulltext.do?id=312239&idType=offset&divLevel=2&queryID=../session/1247778879__29216&area=mwd&forward=refshelf&trail=refshelf, 2 pg.

The Bank Credit Card Business, 2nd Edition, American Bankers Association, Washington D.C., 1996, pp. 1-13, 63-89.

Smart Card handbook, 2nd Edition, W. Rankl and W. Effing, John Wiley and Sons, West Sussex, England, 2000, 49 pgs.

* cited by examiner

METHODS AND SYSTEMS FOR ENCODING A MAGNETIC STRIPE

BACKGROUND OF THE INVENTION

1. Field of the Invention

The present invention relates to transaction cards and, more particularly, to encoding a magnetic stripe associated with a transaction card.

2. Description of the Related Art

Monetary transaction cards generally include smart cards, credit cards, debit cards, automatic teller machine (ATM) cards, identification (ID) cards, and pre-paid cards such as gift cards. Such monetary transaction cards typically include a magnetic stripe, or "magstripe," which is used to enable data to be stored and transmitted. Data which is encoded or otherwise stored on a magnetic stripe may be read by a card reader head, e.g., a card reader head associated with a point-of-sale (POS) system, when the magnetic stripe comes into contact with, and is swiped against, the card reader head.

A monetary transaction card that includes a magnetic stripe is typically a card of a standard credit card size, or a CR-80 card. FIG. 1 is a diagrammatic representation of a standard CR-80 card. A CR-80 card 100 includes a magnetic stripe 108, and has a height H 112 that is approximately 2.125 inches and a width W 116 that is approximately 3.375 inches. A distance D1 120 between magnetic stripe 108 and an edge 104 of CR-80 card 100 is approximately 0.223 inches. Magnetic stripe 108 may include two tracks or three tracks (not shown), each having a height of approximately 0.11 inches. In general, a thickness D2 124 of magnetic stripe 108 may vary depending upon the number of tracks (not shown) associated with magnetic stripe 108. Typically, if two tracks (not shown) are encoded on magnetic stripe 108, thickness D2 124 may be approximately 0.375 inches. Alternatively, if three tracks (not shown) are encoded on magnetic stripe 108, thickness D2 124 may be approximately 0.5 inches.

Information encoded on magnetic stripe 108 is typically encoded beginning at a position P 128 that is approximately 0.25 inches from a left edge 132 of CR-80 card 100. Typically, a starting sentinel value is encoded at approximately position P 128. The starting sentinel value is followed by a data pattern. At the end of the data pattern, an ending sentinel value is encoded. In general, the position at which the ending sentinel value is encoded depends upon the number of characters included in the data pattern. In general, the information encoded onto or otherwise laid down on tracks (not shown) of magnetic stripe 108 is substantially specified by an American National Standards Institute (ANSI) 7811 or an International Standards Organization (ISO)/International Electrotechnical Commission (IEC) 7811 standard.

At times, the amount of space associated with a monetary transaction card that is the size of a standard credit card size may be insufficient from the point-of-view of an issuer of the monetary transaction card. By way of example, if a merchant that distributes a monetary transaction card wishes to display a relatively significant amount of information on the surfaces of the monetary transaction card, the merchant may find that the size of surfaces associated with a standard credit card size are inadequate. However, increasing the surface area associated with a monetary transaction card may result in a larger magnetic stripe that may either be difficult to read or even unreadable using some card reader heads. As a result, data encoded on such a magnetic stripe may not be reliably read.

Therefore, what is needed is a method and an apparatus for providing a magnetic stripe on a transaction card that is able to be reliably read with existing POS equipment regardless of the size of the magnetic stripe.

SUMMARY OF THE INVENTION

The present invention pertains to encoding information on a magnetic stripe of a transaction card. The present invention may be implemented in numerous ways, including, but not limited to, as a method, system, device, or apparatus (including computer program code). Example embodiments of the present invention are discussed below.

According to one aspect of the present invention, a transaction card includes a first surface and a second surface that substantially opposes the first surface. The second surface has a magnetic stripe. A first representation of a first pattern and a second representation of the first pattern are encoded on the magnetic stripe. The first representation is encoded beginning at approximately a first distance from a first edge of the second surface, and the second representation is encoded to within approximately the first distance from a second edge of the second surface.

According to another aspect of the present invention, a transaction card includes a surface that has a first edge and a second edge. The transaction card also includes a magnetic stripe that is substantially incorporated onto the surface. The magnetic stripe has a first sequence encoded thereon and a second sequence encoded thereon. The second sequence is a mirror image of the first sequence. A beginning of the first sequence is encoded beginning at a first location associated with a first distance from the first edge, and an end of the second sequence is encoded at a second location associated with approximately the first distance from the second edge.

In accordance with still another aspect of the present invention, a method for providing information on a magnetic stripe of a transaction card includes creating a first sequence that represents a pattern to be encoded onto the magnetic stripe. The first sequence includes a starting sentinel and an ending sentinel. The starting sentinel indicates a start of the first sequence, and the ending sentinel indicates an end of the first sequence. The method also includes creating a second sequence that represents the pattern to be encoded onto the magnetic stripe. The second sequence includes at least a first sentinel. The first sequence is encoded onto the magnetic stripe such that the starting sentinel is located at a first location that is a first distance from a first edge of the magnetic stripe, and the second sequence is encoded onto the magnetic stripe such that the first sentinel is located at a second location that is the first distance from a second edge of the magnetic stripe.

According to yet another aspect of the present invention, an encoder arrangement includes a pattern input configuration that obtains data to be encoded onto a magnetic stripe of a transaction card, and a pattern representation generator. The pattern representation generator is configured to generate a first representation of the data and a second representation of the data that is a mirror image of the first representation. The encoder arrangement also includes an encoding head that encodes the first representation and the second representation onto the magnetic stripe.

According to still yet another aspect of the present invention, a pre-paid card can have a first side having first, second, third and fourth edges; a second side having the first, second, third and fourth edges; and a magnetic stripe. The second edge is opposite the first edge, and the fourth edge is opposite the third edge. The magnetic stripe can extend across at least the second side of the pre-paid card from the first edge to the second edge. The magnetic stripe stores at least a unique identifier on the magnetic stripe once with respect to the first edge and a second time with respect to the second edge.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

Example embodiments of the present invention are discussed below with reference to the various figures. However, those skilled in the art will readily appreciate that the detailed description given herein with respect to these figures is for explanatory purposes, as the invention extends beyond these embodiments.

The invention pertains to encoding information on a magnetic stripe (also known as "magstripe") of a transaction card. Advantageously, the invention can enable a magnetic stripe of any size to be encoded such that data may be reliably read off of the magnetic stripe and transmitted, even using most if not all existing point-of-sale (POS) equipment. For example, large format cards (e.g., larger than standard credit card size (i.e., CR-80 card)) can be provided and used with POS equipment designed for transaction cards of the standard credit card size A transaction card can, in one embodiment, be a monetary transaction card. Monetary transaction cards may include, but are not limited to including, smart cards, credit cards, debit cards, automatic teller machine (ATM) cards, identification (ID) cards, and prepaid cards such as gift cards. In general, monetary transaction cards are substantially any card which has a stored or otherwise associated monetary value.

In one embodiment, a monetary transaction card may be of substantially any size. That is, a monetary transaction card is not limited to being a size associated with a CR-80, i.e., is not limited to being a standard credit card size. For example, a monetary transaction card may be smaller or larger than a standard credit card. To enable a monetary transaction card with a magnetic stripe, e.g., a magnetic stripe that is longer than a standard magnetic stripe associated with a standard credit card, to be reliably read, a set of data may be encoded twice on magnetic stripe. As a result, the set of data may be read and, hence, transmitted regardless of whether the magnetic stripe is being read left-to-right or right-to-left. A first representation of the set of data may be encoded in an order as substantially specified in the set of data, while a second representation of the set of data may be encoded in a substantially reverse order, e.g., as a substantially mirror image of the first representation of the set of data.

Figure 1:
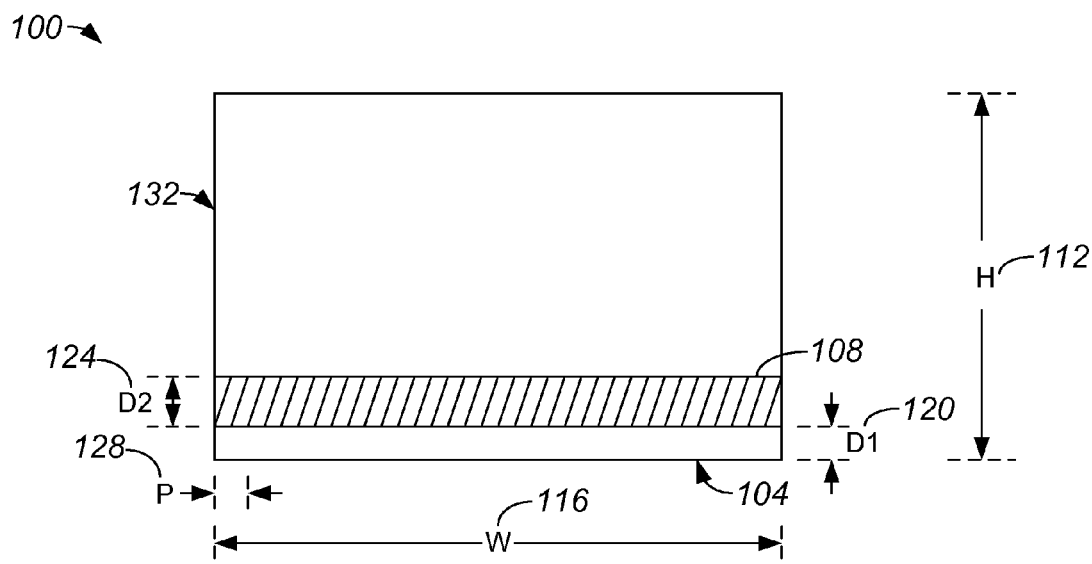
FIG. 1 is a diagrammatic representation of a monetary transaction card that is a standard CR-80 size or credit card size.
Figure 2:
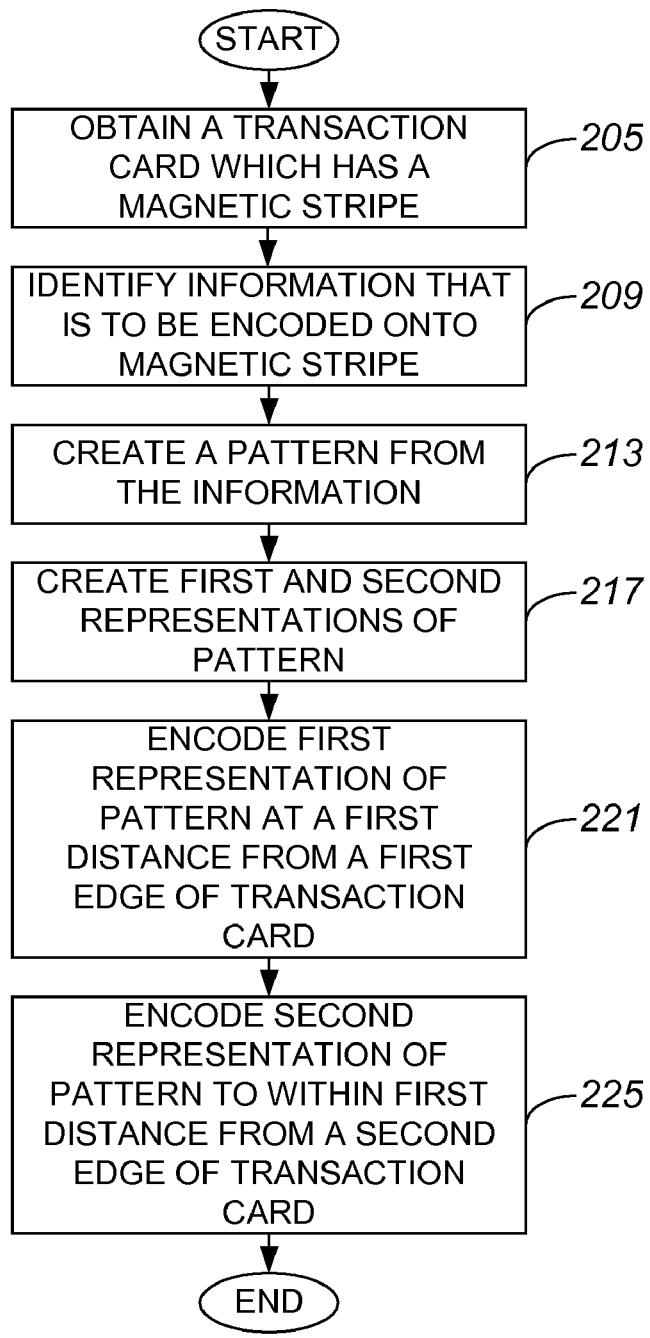
FIG. 2 is a process flow diagram which illustrates a process of encoding a magnetic stripe on a transaction card in accordance with an embodiment of the present invention.

Referring initially to FIG. 2, a method of encoding a magnetic stripe on a transaction card will be described in accordance with an embodiment of the present invention. A process 200 of encoding a magnetic stripe on a transaction card can begin at step 205 in which a transaction card on which a magnetic stripe has been incorporated is obtained. The transaction card may be substantially any size. By way of example, the transaction card may be larger than a standard credit card and, hence, the magnetic stripe may be larger than a magnetic stripe that is on a standard credit card.

In step 209, information that is to be encoded onto the magnetic stripe of the transaction card can be identified. The information may include a unique code (e.g., card number, serial number or account number) that identifies the transaction card. Additionally, the information can also include a value associated with the transaction card such as a balance or a credit limit, and/or an issuer of the transaction card. However, it should be appreciated that the information may generally include any suitable data or values. The information that is to be encoded onto the magnetic stripe may differ depending upon the type of transaction card and/or the requirements of an issuer of the transaction card.

After the information is identified, a pattern can be created from the information in step 213. In one embodiment, a pattern can include a start indicator, or a starting sentinel, and an end indicator, or an ending sentinel. Alternatively, a pattern may be positioned between a start indicator and an end indicator, such that the start indicator and the end indicator can delineate a beginning and an end, respectively, of the pattern but are not part of the pattern. A starting sentinel and an ending sentinel may any suitable characters that enable a card reader to determine data and to be read from the magnetic stripe of the card. Although the starting sentinel and the ending sentinel may generally be represented by different characters, it should be appreciated that the starting sentinel and the ending sentinel may instead be represented by the same character. Further, starting sentinels and ending sentinels may each be represented by individual characters or may be represented by a sequence of characters.

Once the pattern is created, first and second representations of the pattern can be created in step 217. The first and second representations may effectively be the same as the pattern, or may be different representations of the pattern. An example pattern may be "% 1 2 3 4 5 6 7 8 9 ?" where "%" is a starting sentinel, "1 2 3 4 5 6 7 8 9" is information or data to be encoded onto the magnetic stripe, and "?" is an ending sentinel. For such a pattern, a first representation may be "% 1 2 3 4 5 6 7 8 9 ?," which is substantially the same sequence of characters that is associated with the pattern. A second representation may be, in one embodiment, the reverse of or a mirror image of the first representation, i.e., "? 9 8 7 6 5 4 3 2 1 %." While the example pattern includes starting and ending sentinels, it should be appreciated that a pattern may be defined as not including starting and ending sentinels.

The first representation of the pattern can be encoded onto the magnetic stripe in step 221. The first representation may be encoded onto the magnetic stripe using any suitable method, as will be known by those skilled in the art. The first representation of the pattern can be encoded onto the magnetic stripe beginning at a predetermined location on the magnetic stripe. The predetermined location can be located at a first distance from a first edge of the transaction card. In one embodiment, the first distance can be approximately 0.25 inches from the first edge of the transaction card.

After the first representation of the pattern is encoded onto the magnetic stripe in step 221, process flow moves to step 225 in which the second representation of the pattern can be encoded onto the magnetic stripe. The second representation can be generally encoded up to a first distance from a second edge of the transaction card. In other words, the second representation is encoded such that either a starting sentinel or an ending sentinel associated with the second representation is encoded at a location that corresponds to the first distance from the second edge. By way of example, if the second representation is substantially the same as the first representation, an ending sentinel of the second representation can be encoded at the location that corresponds to the first distance from the second edge. Alternatively, if the second representation is effectively a mirror image of the first representation, a starting sentinel of the second representation can be encoded at the location that corresponds to the first distance from the second edge. Once the second representation is encoded onto the magnetic stripe, the process 200 of encoding a magnetic stripe can be complete.

Figure 3:
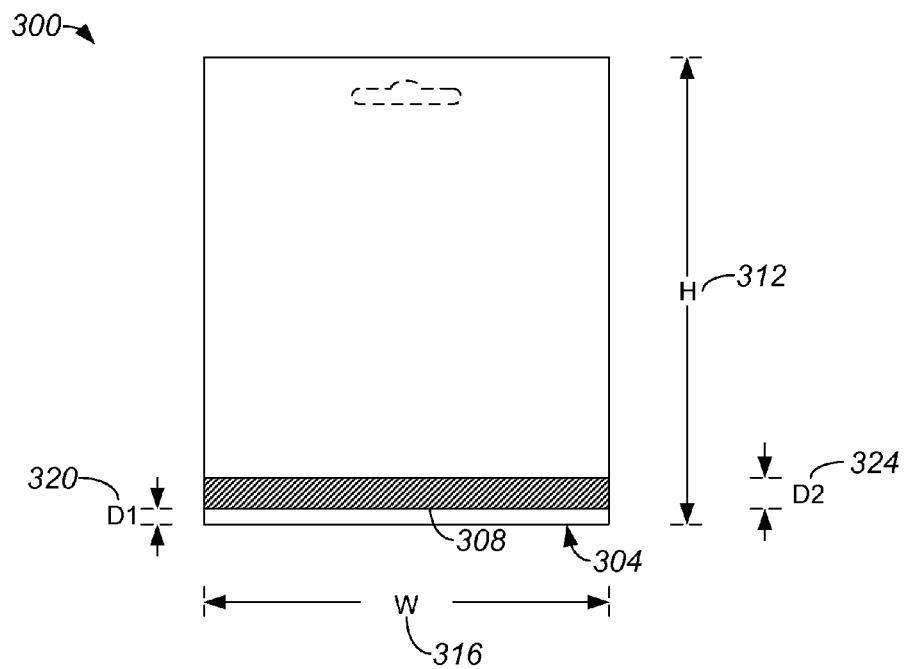
FIG. 3 is a diagrammatic representation of a transaction card which includes a magnetic stripe that includes two representations of a data pattern in accordance with an embodiment of the present invention.

As previously mentioned, a transaction card may be substantially any size and, hence, may have a magnetic stripe of substantially any width. One example of a transaction card will be described with respect to FIG. 3. It should be noted that the transaction card of FIG. 3 is shown for purposes of illustration, and not for purposes of limitation. In other words, transaction cards associated with the present invention are not limited to being the same size as the transaction card shown in FIG. 3. FIG. 3 is a diagrammatic representation of a transaction card which includes a magnetic stripe that includes two representations of a data pattern in accordance with an embodiment of the present invention. A transaction card 300 includes a magnetic stripe 308 that is located at a distance D1 320 from an edge 304 of transaction card 300. Distance D1 320, which is a distance between an edge of magnetic stripe 308 and edge 304, may be approximately 0.223 inches. It should be appreciated, however, that distance D1 320 may vary depending upon the requirements of a particular card reader that may be reading information from magnetic stripe 308.

A thickness D2 324 of magnetic stripe 308 may vary widely. By way of example, thickness D2 324 may vary depending upon the number of tracks (not shown) associated with magnetic stripe 308. In general, thickness D2 324 may be approximately 0.375 inches if two tracks (not shown) are encoded on magnetic stripe 308, while thickness D2 324 may be approximately 0.5 inches if three tracks (not shown) are encoded on magnetic stripe 308.

A height H 312 and a width W 316 of transaction card 300 may vary. In the embodiment as shown, height H 312 may be approximately 6.5 inches while width W 316 may be approximately 4.5 inches. As shown in FIG. 3, width W 316 corresponds in the described embodiment to both a width of transaction card 300 and a width of magnetic stripe 308. More generally, however, height H 312 may be substantially any height that is approximately 2.125 inches or greater, while width W 316 may be substantially any width that is approximately 3.375 inches or greater. As one example, the width 316 can be 4.0 inches or greater. As another example, the width can be approximately 12.0 inches. As still another example, the width 316 can be approximately the width of a poster.

Further, in one embodiment, a transaction card (e.g., the transaction card 300) can pertain to a content specific digital media product that facilitates acquisition of a particular collection of digital media assets. Additional details on content specific digital media products can be found in U.S. patent application Ser. No. 11/849,802, filed Sep. 4, 2007 and entitled "METHOD AND APPARATUS FOR PURCHASING DIGITAL PLAYLISTS", which is hereby incorporated herein by reference in its entirety.

Figure 4:
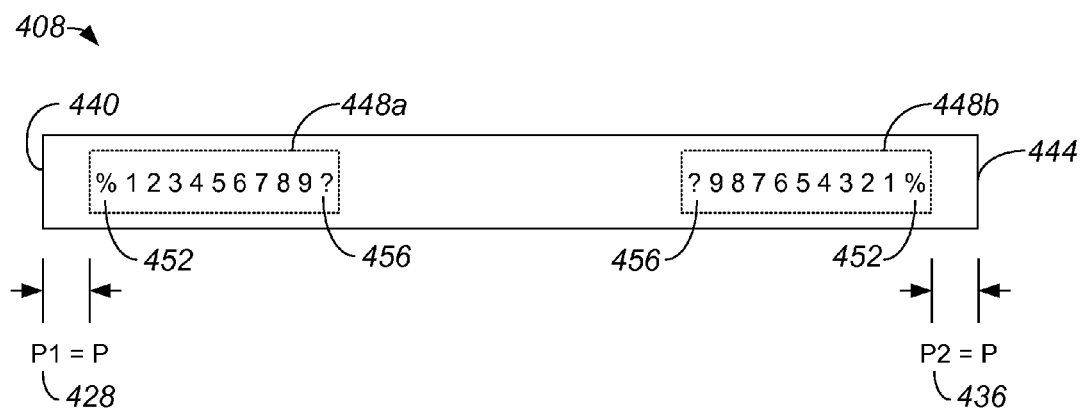
FIG. 4 is a diagrammatic representation of information encoded on a magnetic stripe in accordance with a first embodiment of the present invention.

Dual representations of a pattern, e.g., a data pattern or a sequence of characters, may be substantially the same representation, or may be mirror images of each other, as discussed above. By encoding one representation and a mirror image of the representation on a magnetic stripe, the reading of the magnetic stripe by a unidirectional card reader may be facilitated. That is, a transaction card that includes a magnetic stripe onto which a representation and a mirror image of the representation have been encoded can be read left-to-right and right-to-left reliably. With reference to FIG. 4, a magnetic stripe which has a first representation of a pattern and a mirror image of the first representation encoded thereon will be described in accordance with an embodiment of the present invention. A magnetic stripe 408 includes a first edge 440 and a second edge 444. First edge 440 typically corresponds to a first edge of a transaction card (not shown), while second edge 440 typically corresponds to a second or opposite edge of the transaction card.

A pattern which is effectively encoded on magnetic stripe 408 may include a starting sentinel, characters that represent information such as a unique code (e.g., serial number, account number, etc.), and an ending sentinel. The unique code can also be referred to as a unique identifier. As previously mentioned, a starting sentinel and an ending sentinel may not necessarily be considered to be part of a pattern. However, for ease of discussion, the pattern described with respect to FIG. 4 is presumed to including a starting sentinel and an ending sentinel. By way of example, a pattern may be "% 1 2 3 4 5 6 7 8 9 ?."

A first representation 448a of a pattern "% 1 2 3 4 5 6 7 8 9 ?" may be substantially the same as the pattern. That is, first representation 448a may have the format of the pattern. A starting sentinel "%" 452 in first representation 448a is encoded at a distance P1 428 from edge 440. An ending sentinel 456 of first representation 448a essentially signals an end of data that is to be read from magnetic stripe 408 if a card reader (not shown) begins reading magnetic stripe 408 from first edge 440.

In the described embodiment, a second representation 448b of a pattern "% 1 2 3 4 5 6 7 8 9 ?" is effectively a mirror image of both the pattern and first representation 448a. A starting sentinel "%" 452 in second representation 448b is encoded at a distance P2 436 from edge 444. Distance P2 436 and distance P1 428 can have approximately the same length "P". That is, starting sentinel 452 of first representation 448a is effectively located at the same distance from first edge 440 as starting sentinel 452 of second representation 448b is located from second edge 444. Distance P1 428 and distance P2 436 may have a length of approximately 0.25 inches, although the magnitude may vary depending upon the requirements of a particular system, e.g., a particular card reader, and/or the requirements of a particular type of transaction card. An ending sentinel 456 of second representation 448b identifies an end of data that is to be read from magnetic stripe 408 if a card reader (not shown) begins reading magnetic stripe 408 beginning at second edge 444.

When there is space remaining on magnetic stripe 408 even after accommodating the encoding of first representation 448a and second representation 448b, that space may either be encoded with dummy information or left blank. In other words, portions of magnetic stripe 408 located between ending sentinel 456 of first representation 448a and ending sentinel 456 of second representation 448b may either be encoded with effectively meaningless characters or left unencoded. Alternatively, portions of magnetic stripe 408 located between ending sentinel 456 of first representation 448a and ending sentinel 456 of second representation 448b can be encoded with other data that may be useful to the particular use of the transaction card. As will be appreciated by those skilled in the art, the amount of space remaining on magnetic stripe 408 after the encoding of first representation 448a and second representation 448b is accounted for depends upon not only the width of the magnetic stripe 408 but also the amount of information associated with first representation 448a and second representation 448b. If first representation 448a and second representation 448b include enough data, there may effectively be no portions of magnetic stripe 408 which are available either to be left blank or to be encoded with dummy information.

Figure 5:
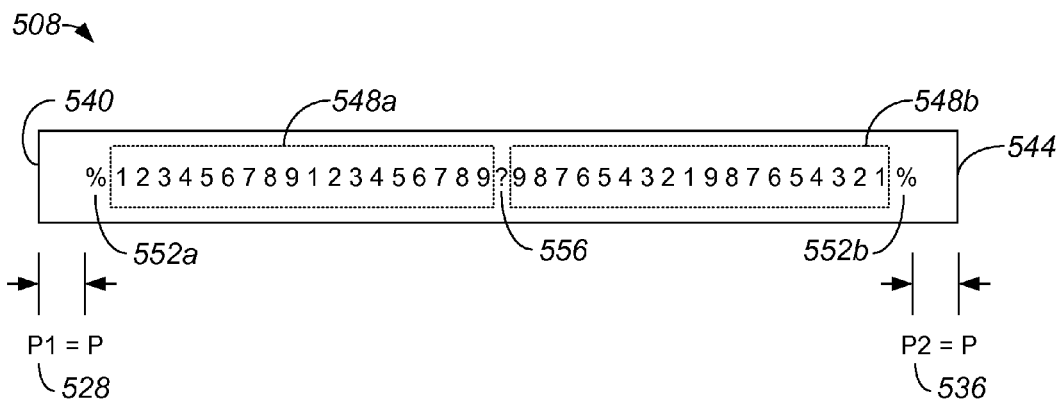
FIG. 5 is a diagrammatic representation of information encoded on a magnetic stripe in accordance with a second embodiment of the present invention.

FIG. 5 is a diagrammatic representation of representations of a pattern that does not include starting and ending sentinels encoded on a magnetic stripe in accordance with an embodiment of the present invention. A magnetic stripe 508 includes a first edge 540 and a second edge 544. A first representation 548a of a pattern is encoded between a first starting sentinel 552a and an ending sentinel 556. First starting sentinel 552a is encoded at a distance P1 528 from first edge 540. A second representation 548b of the pattern is effectively a mirror image of first representation 548a, and is encoded between ending sentinel 556 and second starting sentinel 552b. Second starting sentinel 552b is encoded at a distance P2 536 from second edge 544. Typically, distance P1 528 and distance P2 536 are approximately the same.

Although a single, shared ending sentinel 556 is included on magnetic stripe 508, it should be appreciated that each starting sentinel 552a, 552b may instead each have a separate, associated ending sentinel. As shown in FIG. 5, first representation 548a and second representation 548b include a relatively large amount of data. Therefore, the use of a single, shared ending sentinel 556 may be advantageous if there is insufficient space remaining on magnetic stripe 508 to accommodate the encoding of individual ending sentinels.

Figure 6:
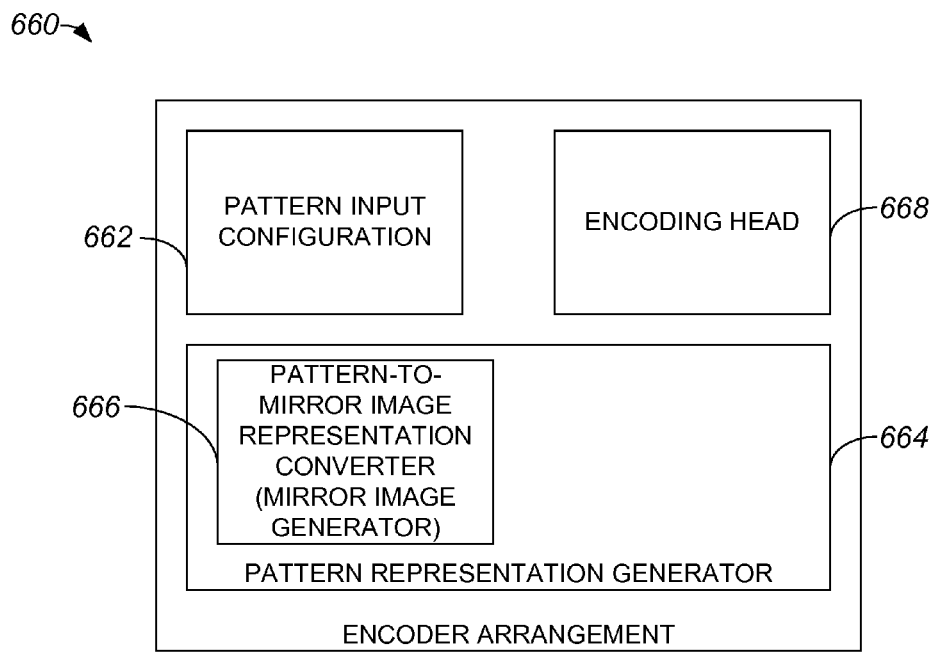
FIG. 6 is a block diagram representation of an encoder that is suitable for encoding a magnetic stripe in accordance with an embodiment of the present invention.

A system or an apparatus that is used to encode dual representations of a pattern on a magnetic stripe of a transaction card may generally include hardware and/or software devices. Hardware may include logic, and software devices may include logic or code devices embodied on a computer-readable medium. One suitable encoder arrangement will be described with respect to FIG. 6 in accordance with an embodiment of the present invention. An encoder arrangement 660 is generally configured to encode more than one representation of a pattern onto a magnetic stripe. Encoder arrangement 660 includes a pattern input configuration 662 that obtains a pattern which is to be encoded onto a magnetic stripe. A pattern representation generator 664 utilizes the pattern obtained by pattern input configuration 662 to generate a representation of the pattern. In one embodiment, the representation of the pattern may be substantially the same as the pattern.

Pattern representation generator 664 includes logic arranged to create a mirror image of a pattern. That is, pattern representation generator 664 includes a pattern-to-mirror image representation converter 666 that is configured to create a mirror image of a pattern. Encoder arrangement 660 can also includes an encoding head 668 that is suitable for writing representations of patterns onto or encoding a magnetic stripe.

Figure 7:
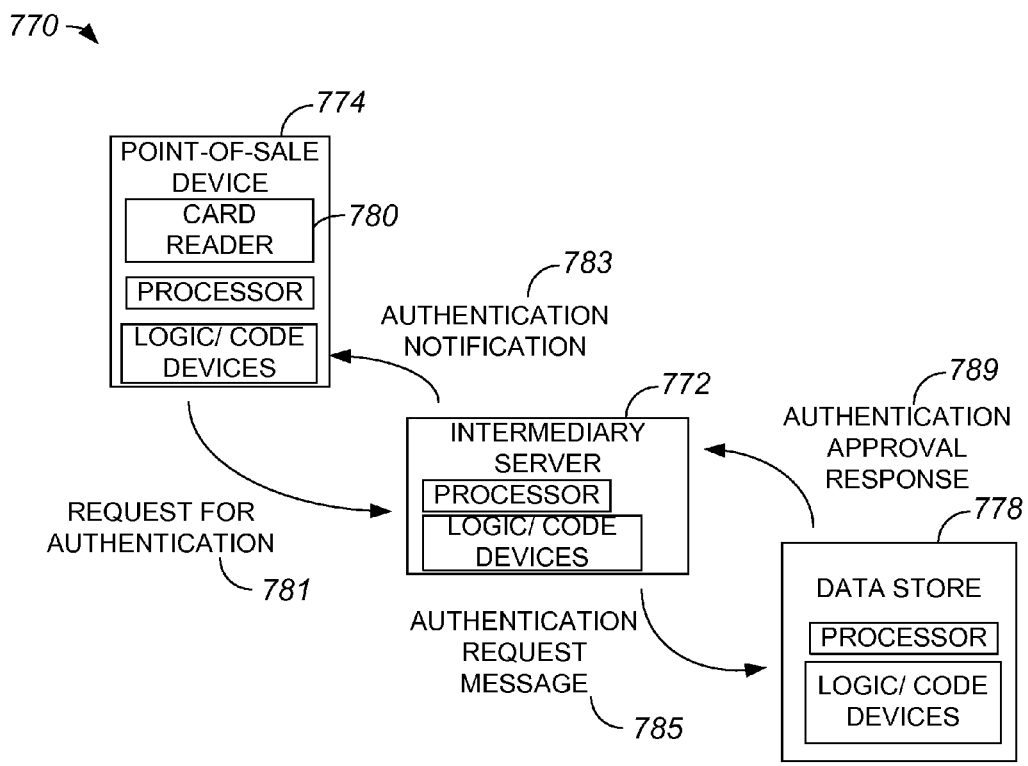
FIG. 7 is a block diagram representation of an overall system that authenticates and reads a transaction card in accordance with an embodiment of the present invention.

FIG. 7 is a block diagram representation of an example of an overall system that authenticates and reads a transaction card, such as a card, in accordance with an embodiment of the present invention. A system 770 which allows a transaction card to be authenticated includes a point-of-sale device 774, an intermediary server 772, and a data store arrangement 778. Point-of-sale device 774, intermediary server 772, and data store arrangement 778 are generally in communication over a network that may include either or both wired and wireless connections.

Point-of-sale device 774 may be a computing device associated with a retail location at which a transaction card (not shown) is to be used. Point-of-sale device 774 includes a card reader 780 that a magnetic stripe of a transaction card (not shown) is arranged to be swiped through in order to be read. In general, card reader 780 includes a card reader head. In one embodiment, point-of-sale device 774 may be a cash register of a retailer that accepts a transaction card (not shown) as tender for payment.

Data store arrangement 778 may be associated with a merchant that maintains information relating to a transaction card (not shown), may be associated with a financial institution such as a bank, or may be associated with intermediary server 772. Intermediary server 722 may be a server associated with an entity that is arranged to obtain information from point-of-sale device 774, e.g., information read from a transaction card (not shown) by card reader 780, and to facilitate communications between point-of-sale device 774 and data store arrangement 778 to authenticate the transaction card. Intermediary server 772 is also arranged to activate a transaction card (not shown), and may be associated with a payment processing organization that provides merchant transaction processing services. The information read by card reader 780 from a transaction card (not shown) may include a unique identifier (e.g., serial number, account number, etc.) that can be used by intermediary server 772 to authenticate or to activate the transaction card.

When a transaction card (not shown) is swiped or otherwise read by card reader 780, point-of-sale device 774 sends a request 781 for authentication to intermediary server 772. In one embodiment, authentication may include activation of a transaction card (not shown). Upon receiving request 781, intermediary server 772 identifies an account number or serial number contained in request 781, and may send an authentication request message 785 to data store 778. In cooperation with data store 778, intermediary server 772 may authenticate a transaction card (not shown). By way of example, data store 778 may provide an authentication approval response 789 to intermediary server 772, which may then provide an authentication notification 783 to point-of-sale device 774.

Point-of-sale device 774, intermediary server 772, and data store arrangement 778 each perform some processing as a part of an overall authentication process. Each contains hardware logic and/or software code devices that are executable to cause parts of the overall authentication process to be implemented. The overall authentication process may include, but is not limited to including, activating a transaction card (not shown), determining whether the transaction card is valid, determining whether there are sufficient funds associated with the transaction card to complete a desired transaction, and updating a monetary balance associated with the transaction card once a transaction has been completed. Software code devices may be stored on computer-readable media, as for example memories or memory devices.

Figure 8:
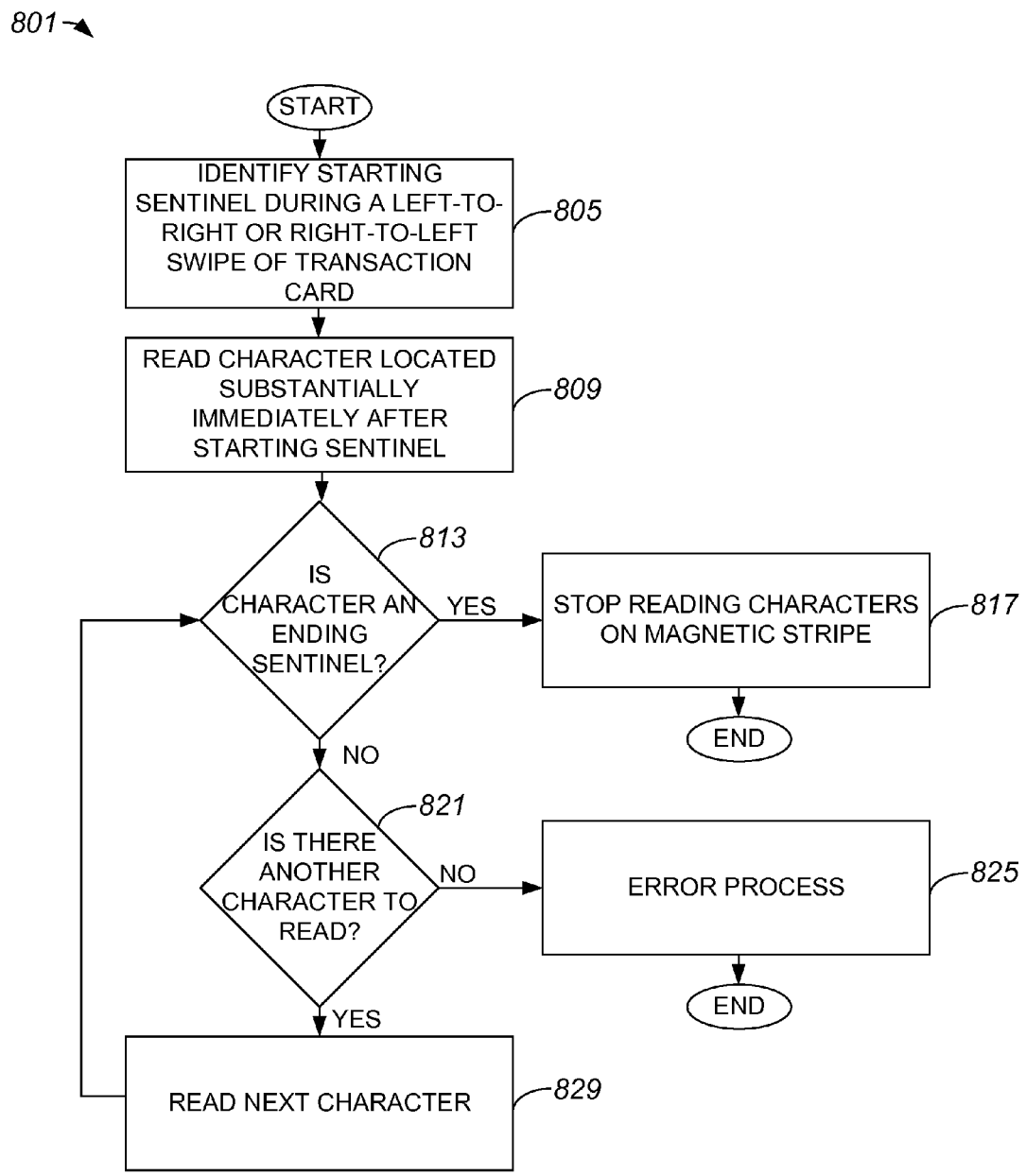
FIG. 8 is a process flow diagram which illustrates a method of reading a magnetic stripe which includes a representation of a data pattern and a mirror image representation of the data pattern in accordance with an embodiment of the present invention.

Referring next to FIG. 8, one method of reading a magnetic stripe on which at least two representations of a data pattern are encoded will be described in accordance with an embodiment of the present invention. In the described embodiment, a first representation of the data pattern is in an order substantially specified by the data pattern, i.e., the first representation has a format like the data pattern, and a second representation of the data pattern has a format reversed from the first representation. By way of example, the data pattern may be a sequence, the first representation may be substantially the same as the sequence, and the second representation may be the reverse of or a mirror image of the sequence.

A process 801 of reading contents encoded on a magnetic stripe using a card reader associated with a point-of-sale system can begin at step 805 in which a transaction card with a magnetic stripe is scanned in a card reader, and a starting sentinel can be identified during either a left-to-right or right-to-left swipe of the transaction card. Upon identifying the starting sentinel, the character located substantially immediately after the starting sentinel on the magnetic stripe can be read in step 809.

A determination can then be made in step 813 as to whether the character obtained or read in step 809 is an ending sentinel. If it is determined that the character is an ending sentinel, the indication is that substantially all data that is to be read has been read. As such, process flow moves to step 817 in which no further characters are read from the magnetic stripe, and the process of reading the contents encoded on a magnetic stripe is completed. It should be appreciated that once the process of reading contents from a magnetic strip is completed, the contents may be provided to an intermediary server as part of a request for authentication.

Alternatively, if it is determined in step 813 that the character read in step 809 is not an ending sentinel, then it is determined in step 821 whether there is another character to read. If it is determined that there is not another character to read, the indication is that there has likely been a problem with reading the magnetic stripe. As an ending sentinel has not been read, the implication is that there is likely to be other characters that remain to be read. However, because other characters to be read are not identified in step 821, a card reader head may have lost contact with the magnetic stripe or the magnetic stripe may be defective. Accordingly, an error process can be activated in step 825. The error process can include providing an indication on a point-of-sale device that the card has not been properly read. After the error process, the process of reading contents from a magnetic strip can end.

If, however, the indication in step 821 is that there is another character to read, the next character encoded on the magnetic stripe can be read in step 829. Flow of process 801 then returns to step 813 in which it is determined whether the character that was read is an ending sentinel.

Although only a few embodiments of the present invention have been described, it should be understood that the present invention may be embodied in many other specific forms without departing from the spirit or the scope of the present invention. By way of example, while the present invention has been described as being suitable for use with respect to monetary transaction cards, the present invention may be applied to substantially any card that effectively stores a data, monetary or otherwise. That is, a magnetic stripe associated with substantially any card that stores data may be encoded with two representations of the same data or pattern.

A magnetic stripe has been described as having two representations of a pattern encoded thereon such that one representation is a mirror image of the other representation. The presence of a mirror image enables a magnetic stripe to be effectively read by a unidirectional card reader. However, when there are a plurality of representations of a pattern encoded on a magnetic stripe, the representations do not necessarily utilize a mirror image representation. For instance, a magnetic stripe may include two same, or substantially the same, representations of a data pattern.

The size of a transaction card that includes a magnetic stripe which has more than one representation of a pattern may vary widely. Hence, the size of a magnetic stripe may also vary widely. While a magnetic stripe may generally have substantially the same width as its host transaction card, a magnetic stripe may instead be less wide than the host transaction card. That is, the magnetic stripe may not necessarily traverse the entire width of the host transaction card.

In one embodiment, a host transaction card effectively include a non-continuous magnetic stripe. That is, a host transaction card may include a first magnetic stripe on which a first representation of a pattern is encoded, and a second magnetic stripe on which a second representation of the pattern is encoded. Such a host transaction card may be configured such that the first and second magnetic stripes are located at the same distance from a common edge, e.g., a bottom edge, of the host transaction card.

It should be appreciated that substantially any magnetic stripe may include two or more representations of a data pattern. In other words, the encoding of a magnetic stripe with two representation of a data pattern is not limited to magnetic stripes associated with transaction cards that are larger than standard credit cards. By way of example, if a data pattern that is to be encoded on a magnetic stripe of a standard-sized transaction card is relatively short, two representations of the data pattern may be encoded on the magnetic stripe.

As standards associated with card readers that read magnetic stripes of transaction cards evolve, the positioning of magnetic stripes on transaction cards may vary. Hence, it should be appreciated that dimensions described above, as for example dimension D1 320 of FIG. 3, may vary as standards change. Therefore, as previously mentioned, the dimensions described with respect to the present invention are examples of suitable dimensions.

The operations associated with the methods of the present invention may vary widely. Steps may be added, removed, altered, combined, and reordered without departing from the spirit of the scope of the present invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A transaction card comprising:
   a first surface; and
   a second surface, the second surface being arranged to substantially oppose the first surface, the second surface including a magnetic stripe, the magnetic stripe having a first representation of a first pattern encoded thereon, the magnetic stripe further having a second representation of the first pattern encoded thereon, the first representation being encoded beginning at approximately a first distance from a first edge of the second surface, the second representation being encoded to within approximately the first distance from a second edge of the second surface, wherein the first representation of the first pattern is positioned between a first start sentinel and a first end sentinel, the first start sentinel being positioned at approximately the first distance from the first edge, and wherein the second representation is positioned between a second start sentinel and the first end sentinel, the second start sentinel being positioned at approximately the first distance from the second edge.

2. The transaction card of claim 1, wherein the first distance is approximately 0.25 inches.

3. The transaction card of claim 1, wherein the second representation is a mirror image of the first representation.

4. The transaction card of claim 3, wherein the second representation is encoded beginning at the first distance from the second edge.

5. The transaction card of claim 1, wherein the first start sentinel corresponds to a first character and the second start sentinel is the first character.

6. The transaction card of claim 5, wherein the first end sentinel corresponds to a second character and the second end sentinel is the second character.

7. The transaction card of claim 1, wherein a bottom edge of the magnetic stripe is positioned at approximately 0.223 inches from a bottom edge of the second surface.

8. A transaction card, comprising:

a first surface; and a second surface, the second surface being arranged to substantially oppose the first surface, the second surface including a magnetic stripe, the magnetic stripe having a first representation of a first pattern encoded thereon, the magnetic stripe further having a second representation of the first pattern encoded thereon, the first representation being encoded beginning at approximately a first distance from a first edge of the second surface, the second representation being encoded to within approximately the first distance from a second edge of the second surface, wherein the second representation is a mirror image of the first representation, wherein the first representation of the first pattern includes a first start sentinel and ends with a first end sentinel, the first start sentinel being positioned at approximately the first distance from the first edge, and wherein the second representation includes a second start sentinel and ends with a second end sentinel, the second start sentinel being positioned at approximately the first distance from the second edge.

9. A transaction card comprising:

a surface, the surface including a first edge and a second edge; and a magnetic stripe incorporated onto the surface, the magnetic stripe having a first sequence encoded thereon, the magnetic stripe further having a second sequence encoded thereon, the second sequence being a mirror image of the first sequence, wherein a beginning of the first sequence is encoded beginning at approximately a first location associated with a first distance from the first edge and an end of the second sequence is encoded at a second location associated with approximately the first distance from the second edge, wherein the first sequence is positioned between a first start sentinel and a first end sentinel, the first start sentinel being positioned at approximately the first location from the first edge, and wherein the second sequence is positioned between a second start sentinel and the first end sentinel, the second start sentinel being positioned at approximately the first location from the second edge.

10. The transaction card of claim 9 wherein, the starting sentinel is encoded at the first location.

11. The transaction card of claim 9 wherein the first distance is approximately 0.25 inches.

12. The transaction card of claim 9 wherein the first edge and the second edge are separated by a first width that is at least approximately 3.375 inches, and the magnetic stripe has a second width that is approximately equal to the first width.

13. A method for providing information on a magnetic stripe of a transaction card, the method comprising:

obtaining a first sequence that represents a pattern to be encoded onto the magnetic stripe, the first sequence including a starting sentinel and an ending sentinel, the starting sentinel being arranged to indicate a start of the first sequence, the ending sentinel being arranged to indicate an end of the first sequence;

creating a second sequence that represents the pattern to be encoded onto the magnetic stripe, the second sequence including at least a first sentinel and the second sequence is a mirror image of the first sequence;

encoding the first sequence on the magnetic stripe such that the starting sentinel is located at a first location that is approximately a first distance from a first edge of the magnetic stripe; and encoding the second sequence on the magnetic stripe such that the first sentinel is located at a second location that is approximately the first distance from a second edge of the magnetic stripe.

14. The method of claim 13 wherein the second sequence is a mirror image of the first sequence, and the first sentinel is the starting sentinel.

15. The method of claim 13 wherein the first distance is approximately 0.25 inches.

16. The method of claim 13 wherein the magnetic stripe has a width of approximately 3.375 inches or more.

17. A computer-readable medium suitable for providing information on a magnetic stripe of a transaction card, the computer-readable medium comprising:

code devices that cause a first sequence to be created that represents a pattern to be encoded onto the magnetic stripe, the first sequence including a starting sentinel and an ending sentinel, the starting sentinel being arranged to indicate a start of the first sequence, the ending sentinel being arranged to indicate an end of the first sequence;

code devices that cause a second sequence to be created that represents the pattern to be encoded onto the magnetic stripe, the second sequence including at least a first sentinel and the second sequence is a mirror image of the first sequence;

code devices that cause the first sequence to be encoded on the magnetic stripe such that the starting sentinel is located at a first location that is a first distance from a first edge of the magnetic stripe; and code devices that cause the second sequence to be encoded on the magnetic stripe such that the first sentinel is located at a second location that is the first distance from a second edge of the magnetic stripe.

18. An encoder arrangement comprising:
a pattern input configuration, the pattern input configuration being arranged to obtain data to be encoded onto a magnetic stripe of a transaction card;
a pattern representation generator, the pattern representation generator being configured to generate a first representation of the data, the pattern representation generator further being configured to generate a second representation of the data; and
an encoding head, the encoding head being configured to encode the first representation and the second representation onto the magnetic stripe, the magnetic stripe having a first sequence encoded thereon, the magnetic stripe further having a second sequence encoded thereon, the second sequence being a mirror image of the first sequence, wherein a beginning of the first sequence is encoded beginning at approximately a first location associated with a first distance from a first edge of the magnetic stripe and an end of the second sequence is encoded at a second location associated with approximately the first distance from a second edge of the magnetic stripe,
wherein the first sequence is positioned between a first start sentinel and a first end sentinel, the first start sentinel being positioned at approximately the first distance from the first edge, and
wherein the second sequence is positioned between a second start sentinel and the first end sentinel, the second start sentinel being positioned at approximately the first distance from the second edge.

19. A pre-paid card, comprising:
a first side, said first side have first, second, third and fourth edges;
a second side, said second side having the first, second, third and fourth edges, the second edge being opposite the first edge, and the fourth edge being opposite the third edge; and
a magnetic stripe extending across at least the second side of said pre-paid card from the first edge to the second edge,
wherein said magnetic stripe stores at least a unique identifier for said pre-paid card,
wherein said magnetic stripe stores at least the unique identifier on said magnetic stripe once with respect to the first edge and a second time with respect to the second edge, and
wherein the storage of at least the unique identifier at the second edge stores the unique identifier in reverse order as compared to the storage of at least the unique identifier at the first edge.

20. The pre-paid card as recited in claim 19, wherein said pre-paid card is for acquisition of a collection of particular digital media assets.

21. The pre-paid card as recited in claim 19, wherein the width of said magnetic stripe on said second side is greater than 3.375 inches.

22. The pre-paid card as recited in claim 19, wherein the width of said magnetic stripe on said second side is greater than 4.0 inches.

* * * * *

UNITED STATES PATENT AND TRADEMARK OFFICE
CERTIFICATE OF CORRECTION

PATENT NO. : 7,837,125 B2
APPLICATION NO. : 11/965674
DATED : November 23, 2010
INVENTOR(S) : Ted Biskupski Page 1 of 1

It is certified that error appears in the above-identified patent and that said Letters Patent is hereby corrected as shown below:

In column 12, line 9, in Claim 10, after "wherein" delete ",".

Signed and Sealed this
Twenty-fifth Day of October, 2011

David J. Kappos
*Director of the United States Patent and Trademark Office*